United States Patent [19]

Puskas et al.

[11] 3,882,163

[45] May 6, 1975

[54] URETHANE DERIVATIVES OF POLYMETHYL BIPHENYL

[75] Inventors: Imre Puskas, Glen Ellyn; Ellis K. Fields, River Forest, both of Ill.

[73] Assignee: Standard Oil Company, Chicago, Ill.

[22] Filed: Jan. 24, 1972

[21] Appl. No.: 220,368

[52] U.S. Cl............ 260/471 C; 260/455 A; 424/300
[51] Int. Cl............................................. C07c 125/06
[58] Field of Search ............................... 260/471 C

[56] References Cited
UNITED STATES PATENTS 3,592,949   7/1971   Teach et al. ................. 260/471 C

*Primary Examiner*—Lorraine A. Weinberger
*Assistant Examiner*—L. A. Thaxton
*Attorney, Agent, or Firm*—Gunar J. Blumberg; Arthur G. Gilkes; William T. McClain

[57] ABSTRACT

Novel urethane derivatives of polymethyl biphenyl useful as fungicides and also having insecticidal, miticidal and nematocidal activities are disclosed. These products are prepared by reacting the appropriate alkyl or aryl chloroformate with the appropriate amino polymethylbiphenyl at temperatures of 0 to 35°C. to produce the corresponding urethane derivatives of polymethyl biphenyl.

11 Claims, No Drawings

URETHANE DERIVATIVES OF POLYMETHYL BIPHENYL

This invention relates to novel urethane derivatives of polymethyl biphenyl. More particularly, this invention relates to urethane derivatives of polymethyl biphenyls having the following formula:

wherein the NH—CO—XR' group occupies the two or three position on the phenyl ring, and wherein X is oxygen or sulfur, R' is an alkyl, aryl or substituted aryl group and $R_2$ and $R_3$ are methyl groups and $n$ and $m$ are integers having values from 2 through 4 inclusive.

These novel compositions have extraordinary fungicidal activity. The compositions of this invention are effective fungicides as well as insecticides, miticides, nematocides and herbicides. They are thus highly valuable and useful in providing actions in single spray or dust which are ordinarily obtained only by combining a variety of different fungicidal and insecticidal agents or by the application of a series of insecticidal and fungicidal compositions. These novel fungicidal compositions are prepared by reacting the amino biphenyl with the corresponding alkyl or aryl chloroformate in pyridine under anhydrous conditions at a temperature of 0 to 35°C. The amino biphenyl has the following structure:

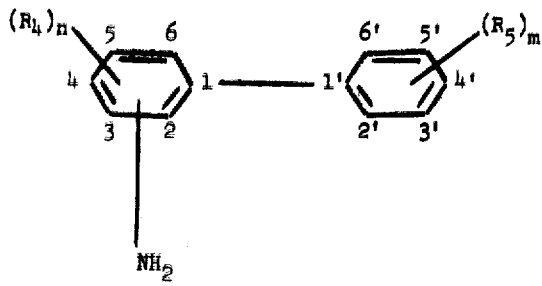

wherein the amino group occupies the 2 or 3 position on the phenyl ring and $R_4$ and $R_5$ are methylene groups and $m$ and $n$ are integers having values from 2 to 4 inclusive.

The preparation of the nitro polyalkyl biphenyls is given in U.S. Pat. No. 3,492,361 and the preparation of the amino biphenyls is given in J. Organic Chemistry, 33 4237 (1968).

The following novel urethane derivatives of polymethyl biphenyl were prepared:
Methyl 2-(3', 4'-dimethylphenyl)-4,5-dimethylcarbanilate
Ethyl 2-(3', 4'-dimethylphenyl)-4,5-dimethylcarbanilate
Isopropyl 2-(3',4'-dimethylphenyl)-4,5-dimethylcarbanilate
Phenyl 2-(3',4'-dimethylphenyl)-4,5-dimethylcarbanilate
Phenyl 2-(3',4'-dimethylphenyl)-4,5-dimethylthiocarbanilate
Ethyl 2-(2',4'-dimethylphenyl)-4,5-dimethylcarbanilate
Methyl 2,4,6-trimethyl-3-(3',4'-dimethylphenyl) carbanilate
Ethyl 2,4,6-trimethyl-3-(3',4'-dimethylphenyl) carbanilate
Isopropyl 2,4,6-trimethyl-3-(3',4'-dimethylphenyl)-carbanilate
Phenyl 2,4,6-trimethyl-3-(3',4'-dimethylphenyl) carbanilate
Phenyl 2,4,6-trimethyl-3-(3',4'-dimethylphenyl)-thio(1)-carbanilate
Isopropyl 2,3,4,5-tetramethyl-6-(3',4'-dimethylphenyl)carbanilate
Methyl 2,4,6-trimethyl-3-(2',4',6'-trimethylphenyl) carbanilate
Isopropyl 2,4,6-trimethyl-3-(2',4',6'-trimethylphenyl)carbanilate In a representative example, 3-amino-2,3',4,4',6-pentamethyl biphenyl (1.9 g.) was dissolved in dry pyridine (15 ml.). The solution was cooled to 0°C. and stirred while ethyl chloroformate (0.92 ml.) was introduced dropwise. After an hour stirring the solvent was removed in vacuo. The residue was taken up in ether and extracted with water, dilute hydrochloric acid and water, successively. From the ether layer, after removal of the solvent, a semi-solid material was obtained. This, from a small amount of hexane, gave white prisms of the urethane which melted at 86° to 91°C. This composition induced 100, 100 and 93 percent control of Powdery Mildew on squash, respectively, at 1,000, 500 and 250 parts per million, thus showing its utility as a fungicide.

The invention is further illustrated in the following examples.

EXAMPLE I

At 0°C, methyl chloroformate (1.16 ml.) was added dropwise to a stirred solution of 2-amino-3',4,4',5-tetramethylbiphenyl (3.37 g.) in 4-picoline (1.5 ml.) and toluene (20 ml.). After 30 minutes reaction time, the solvents were removed in vacuo. The residue was partitioned between ether and water. The organic layer was washed with water and dried over sodium sulfate. Removal of the ether left a liquid. This was crystallized from hexane (9 ml.) at 0°C. to give 66% yield of white crystals of the methyl 2-(3',4'-dimethylphenyl)-4,5-dimethylcarbanilate, in the first crop, m.p. 72°–73°C.

Its IR spectrum showed N-H band at 3250 cm$^{-1}$ and C=O band at 1696 cm$^{-1}$ (in Nujol mull).

Methyl 2-(3',4'-dimethylphenyl)-4,5-dimethylcarbanilate prepared as shown in Example I was tested for foliar fungicidal efficacy. The results are shown in the following table:

TABLE I

| Foliar Disease | Treatment Applied | Amount Applied (p.p.m.) | % Disease Control |
|---|---|---|---|
| Apple Scab | Product of Example I | 100 | 100 |
| | | 50 | 100 |
| | | 25 | 100 |
| Bean Mildew | Product of Example I | 100 | 100 |
| | | 50 | 100 |
| | | 25 | 100 |
| Bean Rust | Product of Example I | 100 | 100 |
| | | 50 | 94 |
| | | 25 | 68 |
| Powdery Mildew of Cucumbers | Product of Example I | 100 | 100 |
| | | 50 | 60 |
| | | 25 | 0 |

EXAMPLE II

The experiment was analogous to Example I, but in place of methyl chloroformate, ethyl chloroformate (1.42 ml.) was used. The product, ethyl 2-(3',4'-dimethylphenyl)-4,5-dimethylcarbanilate, was a liquid. Its IR spectrum showed N-H band at 3370 cm$^{-1}$ and C=O band at 1735 cm$^{-1}$ (heat liquid between NaCl plates).

EXAMPLE III

At 0°C. ispropyl chloroformate (0.62 ml.) was added dropwise to a stirred solution of 2-amino-3',4,4',5-tetramethylbiphenyl (1.154 g.) in anhydrous pyridine (15 ml.). After 30 minutes reaction time, the solvents were removed in vacuo. Residue was extracted between ether and water. The organic layer was washed with water and dried over sodium sulfate. Removal of the ether left a syrup (1.38 g.), ispropyl 2-(3',4'-dimethylphenyl)-4,5-dimethylcarbanilate. Its IR spectrum showed N-H band at 3400 cm$^{-1}$ and C=O band at 1745 cm$^{-1}$ (neat liquid between NaCl plates).

EXAMPLE IV

At 0°C phenyl chloroformate (1.40 ml.) was added dropwise to a stirred solution of 2-amino-3',4,4',5-tetramethylbiphenyl (2.48 g.) in anhydrous 4-picoline (1.1 ml.) and toluene (20 ml.). The workup procedure of Example I have 3.31 g. of phenyl 2-(3',4'-dimethylphenyl)-4,5-dimethylcarbanilate as white crystals, m.p. 117°-119°C. Its IR spectrum showed the expected N-H and C=O bands at 3330 and 1745 cm$^{-1}$, respectively (in Nujol mull).

EXAMPLE V

At 0°C. phenyl thiochloroformate (1.31 ml.) was added dropwise to a stirred solution of 2-amino-3',4,4',5-tetramethylbiphenyl (2.25 g.) in anhydrous 4-picoline (1.0 ml.) and toluene (20 ml.). The workup procedure of Example I gave a syrup that was dried in 0.3 mm. vacuo at room temperature; the syrup did not crystallize. The IR spectrum of the phenyl 2-(3',4'-dimethylphenyl)-4,5-dimethylthiocarbanilate product showed the N-H and C=O bands at 3340 and 1690 cm$^{-1}$, respectively (neat liquid between NaCl plates).

EXAMPLE VI

At 0°C. ethyl chloroformate (0.92 ml.) was added dropwise to a stirred solution of 2-amino-2',4,4',5-tetramethylbiphenyl (1.85 g.) in anhydrous pyridine (15 ml.). The workup procedure of Example I gave 2.26 g. white product of ethyl 2-(2',4'-dimethylphenyl)-4,5-dimethylcarbanilate, m.p. 101°-104°C. Its IR spectrum showed the N-H and C=O bands at 3400 and 1735 cm$^{-1}$, respectively (in Nujol mull).

EXAMPLE VII

At 0°C. methylchloroformate (0.81 ml.) was added dropwise to a stirred solution of 3-amino-2,3',4,4',6-pentamethylbiphenyl (2.39 g.) in anhydrous pyridine (15 ml.). After 30 minutes reaction time, the solvents were removed in vacuo. The residue crystallized on being triturated with water. The crystals were washed with a little hexane and dried in vacuo to give methyl 2,4,6-trimethyl-3-(3',4'-dimethylphenyl) carbanilate, m.p. 126°-128°C. Its IR spectrum showed the N-H and C=O bands at 3250 and 1695 cm$^{-1}$, respectively (in Nujol mull).

EXAMPLE VIII

At 0°C. ethyl chloroformate (0.92 ml.) was added dropwise to a stirred solution of 3-amino-2,3',4,4',6-pentamethylbiphenyl (1.9 g.) in anhydrous pyridine (15.0 ml.). After 30 minutes reaction time, the solvents were removed in vacuo. The residue was partitioned between ether and water. The organic layer was washed with dilute aqueous hydrochloric acid, then water, and dried over sodium sulfate. Removal of the ether left a semi-solid which was crystallized from a small quantity of hexane. The product, ethyl 2,4,6-trimethyl-3-(3',4'-dimethylphenyl) carbanilate, melted at 86°-91°C. Its IR spectrum showed the N-H and C=O bands at 3280 and 1685 cm$^{-1}$, respectively (in Nujol mull).

EXAMPLE IX

At 0°C. isopropyl chloroformate (1.25 ml.) was added dropwise to a stirred solution of 3-amino-2,3',4,4',6-pentamethylbiphenyl (2.39 g.) in anhydrous pyridine (15 ml.). After 30 minutes reaction time, the solvents were removed in vacuo. The residue cystallized on being triturated with water. The crystals were dried in vacuo and recrystallized from hexane. The white product, isopropyl 2,4,6-trimethyl-3-(3',4'-dimethylphenyl) carbanilate, melted around 90°C.; the melting range depended on the rate of heating. Its IR spectrum showed the N-H and C=O bands at 3230 and 1680 cm$^{-1}$, respectively (in Nujol mull).

EXAMPLE X

At 0°C. phenyl chloroformate (1.4 ml.) was added dropwise to a stirred solution of 3-amino-3,3',4,4',6-pentamethylbiphenyl (2.63 g.) in anhydrous 4-picoline (1.1 ml.) and toluene (20 ml.). The workup procedure of Example I gave 3.55 g. of white crystals, phenyl 2,4,-6-trimethyl-3-(3',4'-dimethylphenyl) carbanilate, m.p. 123°-125°C. Its IR spectrum showed the N-H and C=O bands at 3220 and 1720 cm$^{-1}$, respectively (in Nujol mull).

EXAMPLE XI

At 0°C. phenyl thiochloroformate (1.31 ml.) was added dropwise to a stirred solution of 3-amino-2,3',4,4',6-pentamethylbiphenyl (2.39 g.) in anhydrous 4-picoline (1.0 ml.) and toluene (20 ml.). After 30 minutes reaction time, the solvents were removed in vacuo. The residue was extracted between an ether-benzene mixture and water. The organic layer was washed and dried over sodium sulfate. The solution was concentrated; the product, phenyl 2,4,6-trimethyl-3-(3',4'-dimethylphenyl) thiocarbanilate, crystallized, 3.0 g., m.p. 150°-151°C. Its IR showed the N-H and C=O bands at 3225 and 1670 cm$^{-1}$, respectively (in Nujol mull).

EXAMPLE XII

At 0°C. isopropyl chloroformate (0.70 ml.) was added dropwise to a stirred solution of 2-amino-3,3',4,4',5,6-hexamethylbiphenyl (1.35 g.) in anhydrous pyridine (15 ml.). After 30 minutes reaction time, the solvents were removed in vacuo. The syrupy residue was digested with water, dried in vacuo, and crystallized from hexane (about 8 ml.). The white product, isopropyl 2,3,4,5-tetramethyl-6-(3',4'-dimethylphenyl) carbanilate (1.52 g.), melted at 113°-115°C. Its IR spectrum showed the C=O band at 1710 cm$^{-1}$; surprisingly there were two bands in the N-H stretching region at 3090 and 3180 cm$^{-1}$ (in Nujol mull).

EXAMPLE XIII

Fuming 90% nitric acid (3.6 ml.) was added dropwise to a stirred solution of bimesityl (12.0 g.) in a 1:1 mixture of acetic acid-acetic anhydride (40 ml.). The mixture was heated to 50°C., then poured on ice, and extracted with ether. The organic layer was washed with aqueous sodium hydroxide free of acid, then with water. Removal of the ether left crystals of crude nitrobimesityl, m.p. 94°-96°C. This was used in the next step without further purification.

A mixture of nitrobimesityl (4.0 g.), ethanol (70 ml.), 65% hydrazine (10 ml.) and a spatula tip of wet Raney nickel was refluxed for three hours. Removal of the solvent from the filtered solution gave aminobimesityl as white crystals, (2.5 g.), m.p. 148.5°-149.5°C. The structure was confirmed by IR and mass spectrometry.

Methyl chloroformate (1.0 ml.) was added dropwise to a stirred solution of aminobimesityl (1.7 g.) in anhydrous pyridine (15 ml.). After the exothermic reaction the solvents were removed in vacuo. The residue slowly crystallized on being triturated with water. The crude product, methyl 2,4,6-trimethyl-3-(2',4',6'-trimethylphenyl) carbanilate, 1.94 g. melted at 125°-136°C. Its IR spectrum showed the N-H and C=O bands at 3280 and 1710 cm$^{-1}$, respectively (in Nujol mull).

EXAMPLE XIV

Isopropyl chloroformate (1.3 ml.) was added dropwise to a stirred solution of aminobimesityl (1.5 g.) in anhydrous pyridine (15 ml.). The workup procedure of Example VIII gave a solid foam, m.p. 40°-55°C. The IR spectrum of the isopropyl 2,4,6-trimethyl-3-(2',4',6'-trimethylphenyl) carbanilate showed the expected N-H and C=O bands at 3200 and 1700 cm$^{-1}$, respectively (in Nujol mull).

We claim:

1. A urethane derivative of polymethylbiphenyl having the following formula:

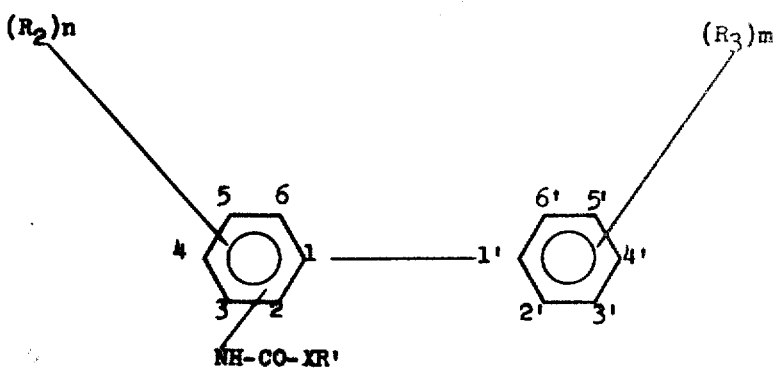

wherein the NH—CO—XR' occupies the two or three position on the phenyl ring, and wherein X is oxygen, R' is a lower alkyl, or phenyl radical and $R_2$ and $R_3$ are methyl groups and n and m are integers having values from 2 through 4 inclusive.

2. A urethane derivative of polymethylbiphenyl having the following formula:

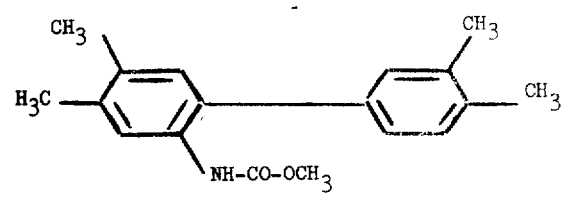

3. A urethane derivative of polymethylbiphenyl having the following formula:

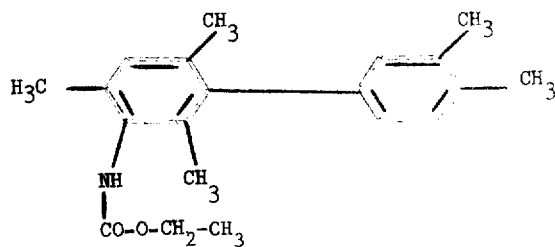

4. The urethane of claim 1 wherein X is oxygen and R' is an ethyl group, n and m are integers each having a value of 2 and wherein the methyl groups are attached on the 4,5 and 4',5' positions on the biphenyl rings, and the NH—CO—XR' group occupies the 2 position on the biphenyl ring.

5. The urethane of claim 1 wherein X is oxygen and R' is an isopropyl group, $n$ and $m$ are integers each having a value of 2 and wherein the methyl groups are attached on the 4,5 and 4',5' positions on the biphenyl rings, and the NH—CO—XR' group occupies the 2 position on the biphenyl ring.

6. The urethane of claim 1 wherein X is oxygen and R' is a phenyl group, $n$ and $m$ are integers each having a value of 2, and wherein the methyl groups are attached on the 4,5 and 4',5' positions on the biphenyl ring, and the NH—CO—XR' group occupies the 2 position on the biphenyl ring.

7. The urethane of claim 1 wherein X is oxygen and R' is an ethyl group, $n$ and $m$ are integers each having a value of 2, and wherein the methyl groups are attached on the 4,5 and 2',4' positions on the biphenyl rings, and the NH—CO—XR' group occupies the 2 position on the biphenyl ring.

8. The urethane of claim 1 wherein X is oxygen and R' is a methyl group, $n$ and $m$ are integers having values 3 and 2, respectively, and wherein the methyl groups are attached on the 2,4,6 and 4',5' positions on the biphenyl rings, and the NH—CO—XR' group occupies the 3 position on the biphenyl ring.

9. The urethane of claim 1 wherein X is oxygen and R' is an isopropyl group, $n$ and $m$ are integers having values 3 and 2, respectively, and wherein the methyl groups are attached on the 2,4,6 and 4',5' positions on the biphenyl rings, and the NH—CO—XR' group occupies the 3 position on the biphenyl ring.

10. The urethane of claim 1 wherein X is oxygen and R' is a phenyl group, $n$ is an integer having a value of 3 and $m$ is an integer having a value of 2, and wherein the methyl groups are attached on the 2,4,6 and 4',5' positions on the biphenyl rings, and the NH—CO—XR' group occupies the 3 position on the biphenyl ring.

11. The urethane of claim 1 wherein X is oxygen and R' is an isopropyl group, $n$ is an integer having a value of 4 and $m$ is an integer having a value of 2, and wherein the methyl groups are attached on the 3,4,5,6 and 4',5' positions on the biphenyl ring, and the NH—CO—XR' group occupies the 2 position on the biphenyl ring.

* * * * *